US012645631B2

(12) United States Patent
Shoji et al.

(10) Patent No.: US 12,645,631 B2
(45) Date of Patent: Jun. 2, 2026

(54) STORAGE SYSTEM

(71) Applicant: Hitachi Vantara, Ltd., Yokohama (JP)

(72) Inventors: Tomoki Shoji, Tokyo (JP); Masanori Takada, Tokyo (JP); Katsuya Tanaka, Tokyo (JP)

(73) Assignee: Hitachi Vantara, Ltd., Kanagawa (JP)

( * ) Notice: Subject to any disclaimer, the term of this patent is extended or adjusted under 35 U.S.C. 154(b) by 11 days.

(21) Appl. No.: 18/829,796

(22) Filed: Sep. 10, 2024

(65) Prior Publication Data

US 2025/0265214 A1 Aug. 21, 2025

(30) Foreign Application Priority Data

Feb. 21, 2024 (JP) ................................. 2024-024705

(51) Int. Cl.
*G06F 13/40* (2006.01)

(52) U.S. Cl.
CPC ........ *G06F 13/409* (2013.01); *G06F 13/4022* (2013.01)

(58) Field of Classification Search
CPC ........................... G06F 13/409; G06F 13/4022
See application file for complete search history.

(56) References Cited

U.S. PATENT DOCUMENTS

| | | | | |
|---|---|---|---|---|
| 2009/0172185 A1* | 7/2009 | Chandra | ............... | G06F 13/387 709/236 |
| 2014/0213101 A1* | 7/2014 | Gomez | ............... | H01R 31/065 439/505 |
| 2014/0359189 A1* | 12/2014 | Kotzur | .................. | G06F 13/385 710/305 |
| 2016/0012001 A1* | 1/2016 | Chang | ................. | G06F 13/4221 710/316 |
| 2017/0358051 A1* | 12/2017 | Heynen | ..................... | G06F 8/61 |
| 2018/0307499 A1* | 10/2018 | Chen | ....................... | G06F 15/76 |
| 2018/0307535 A1 | 10/2018 | Suzuki et al. | | |

FOREIGN PATENT DOCUMENTS

| | | |
|---|---|---|
| JP | 2004-265010 A | 9/2004 |
| WO | 2017/119098 A1 | 7/2017 |

* cited by examiner

*Primary Examiner* — Henry Tsai
*Assistant Examiner* — Harry Z Wang
(74) *Attorney, Agent, or Firm* — Volpe Koenig

(57) ABSTRACT

A storage system includes a plurality of drive slots into which a drive storing data is insertable and one or more controllers including a processor. At least a part of the plurality of drive slots is a common slot into which a first device of a different type from the drive is insertable. A port of the controller at a connection destination of the drive from the common slot and a port of the controller at a connection destination of the first device from the common slot are different.

9 Claims, 15 Drawing Sheets

STORAGE SYSTEM

CLAIM OF PRIORITY

The present application claims priority from Japanese patent application JP 2024-024705 filed on Feb. 21, 2024, the content of which is hereby incorporated by reference into this application.

BACKGROUND OF THE INVENTION

1. Field of the Invention

The present invention relates to a storage system including a plurality of drive slots.

2. Description of the Related Art

The storage system includes, as components, a processor, a primary storage medium (for example, a dynamic random access memory (DRAM)), and a secondary storage medium, and performs data processing by the processor. Conventionally, in a storage system, data is stored in the secondary storage medium using a hard disk drive (HDD). In such a storage system, data read/write performance of an HDD which is a secondary storage medium has been a bottleneck.

However, in recent years, storage systems using a solid state drive (SSD) as a secondary storage medium have been spreading. Since the SSD has higher data read/write performance than the HDD, the above-described performance bottleneck due to the secondary storage medium is eliminated. However, while data read/write performance of the secondary storage medium has been improved, performance improvement of a processor that performs data processing has slowed down, and cases where the processor becomes a processing performance bottleneck of a storage system have increased. Hereinafter, the primary storage medium in the storage system is referred to as a memory, and the secondary storage medium is referred to as a drive.

In order to solve the bottleneck of the data processing performance by the processor, a storage system that off-loads a part of the data processing to an accelerator to reduce the data processing amount performed by the processor has appeared (for example, WO 2017/119098).

In a storage system, examples of processing off-loaded to an accelerator generally include compression and encryption, and it is expected that the type and amount of processing that can be off-loaded will further increase in the future.

However, the number of accelerators that can be loaded by the storage system may be limited, and for example, in a midrange model storage system with severe space and thermal design constraints, it is difficult to load a sufficient number of accelerators to off-load all the off-loadable processing.

Furthermore, in a case where the accelerator is mounted in the storage system, a transmission route for supporting a data processing throughput processed by the accelerator is necessary. PCI-Express (hereinafter, referred to as PCIe. Both are registered trademarks) is known as a standard of a communication network that connects a processor, an accelerator card, and the like. In the case of an accelerator mounted in a storage system, it is often necessary to connect at least via the PCIe x8.

In addition, as a characteristic of the recent market trend, the speed of the capacity increase of the SSD tends to be faster than the speed of the capacity increase of the storage system. Therefore, it is conceivable that the number of slots for internal drives included in the current storage system become redundant in the future.

In addition, in recent years, a standard called EDSFF has appeared as a new form factor of an SSD, and it is considered that the standard will become mainstream as an SSD mounted in a future storage system. One of features of the EDSFF is that PCIe supports up to x16. Therefore, the new standard EDSFF can be connected in a band that can support the data processing throughput of the accelerator. As described above, a storage system having an architecture in which an accelerator is mounted in a drive slot can be considered.

As a conventional technique, JP 2004-265010 A discloses a technique of mounting an optional device other than a drive in a drive slot.

SUMMARY OF THE INVENTION

In a case where, for example, mounting an accelerator in a drive slot is considered, there is a problem that requirements for a device connection destination are different between the drive and the accelerator. In many cases, the drive is connected to both of the two storage controllers in order to ensure the availability of the system, but the data transfer band per transmission route may be connected on x4 in total, x2 each. On the other hand, although the accelerator only needs to be connected to one storage controller, the transmission route needs to secure a band that can support the amount of data to be processed by the accelerator, and it is often necessary to connect at least on x8. Such a difference in requirements of the device connection destination may also occur between a device different from the accelerator and a drive.

The storage system has various requirements depending on the customer, and in order to cope with them, it is desirable to be able to select which one of a drive and an accelerator is mounted in the slot in which the device is mounted. The same applies to a case where a device different from the accelerator is mounted together with the drive.

JP 2004-265010 A discloses a technique of mounting an optional device other than a drive in a drive slot. However, only by mounting the accelerator in the drive slot using the technique disclosed in JP 2004-265010 A, it is not possible to switch the connection destination and the band depending on the mounted device, and the connection requirement of the accelerator is not satisfied. Therefore, in the technique disclosed in JP 2004-265010 A, there is a problem that a device having different connection requirements can be configured only as a dedicated slot of any device even if the device is selected and mounted in the drive slot.

A storage system according to an aspect of the present invention includes: a plurality of drive slots into which a drive storing data is insertable; and one or more controllers including a processor. At least a part of the plurality of drive slots is a common slot into which a first device of a different type from the drive is insertable. A port of the controller at a connection destination of the drive from the common slot and a port of the controller at a connection destination of the first device from the common slot are different.

According to one aspect of the present invention, the drive slot can be treated as a common slot in which either the drive or another type of device can be selected and mounted so as to meet the requirements of the storage system. As a result, it is possible to increase the maximum number of devices other than the drive that can be mounted on the storage system, and the performance of the storage system can be improved.

BRIEF DESCRIPTION OF THE DRAWINGS

FIG. 2 is a front view illustrating an example of a midplane provided with a common slot according to the first embodiment;

FIG. 8 is a front view illustrating an example of a midplane provided with a common slot according to a second embodiment;

FIG. 14 is a diagram illustrating an example of a midplane provided with a common slot according to a third embodiment;

DESCRIPTION OF THE PREFERRED EMBODIMENTS

Figure 1:
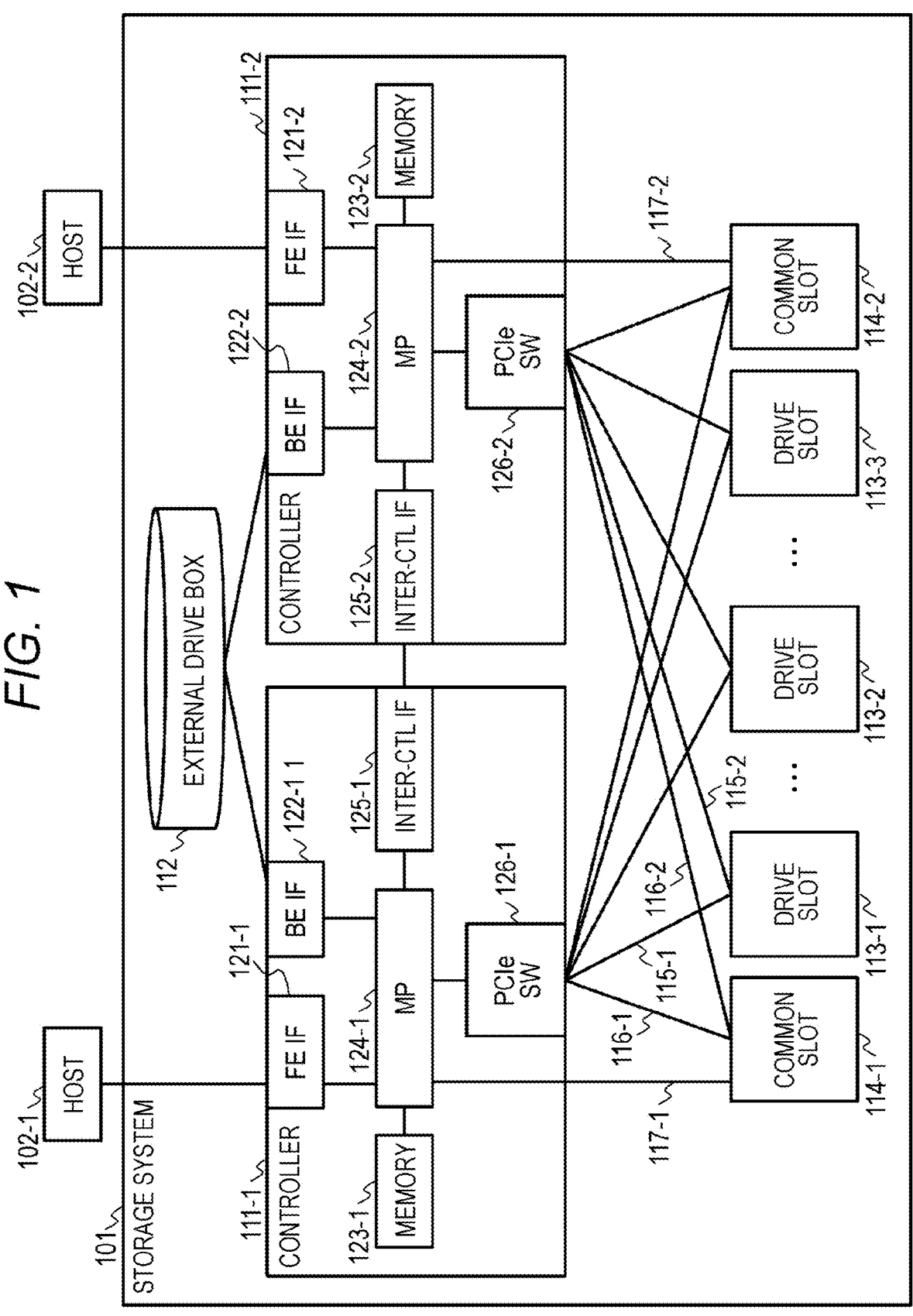
FIG. 1 is a block diagram illustrating an example of a storage system according to a first embodiment.

Hereinafter, embodiments will be described using the drawings. Note that the embodiments are merely examples for realizing the present invention, and do not limit the technical scope of the present invention, and all combinations of features described in the embodiments are not necessarily essential to the solution of the invention.

In the following description, various types of information may be described using expressions of "xxx table". However, various types of information may be expressed by a data structure other than tables. "xxx table" may be called "xxx information" to indicate that they do not depend on the data structure. In addition, in the following description, a number is used as the identification information of the element, but another type of identification information (for example, a name or an identifier) may be used.

In addition, in the following description, in a case where similar types of elements are distinctively described without distinction, the common symbol in the reference symbols (or reference symbol) may be used. In a case where the similar types of elements are distinguished, the reference symbols of the elements (or the IDs of elements) may be used.

A program is executed by a processor (for example, a central processing unit (CPU)) included in the storage controller, so that predetermined processing is appropriately performed using a storage resource (for example, main storage) and/or a communication interface device. Therefore, a subject of the processing may be the storage controller or the processor. In addition, the storage controller may include a hardware circuit that performs a part or all of the processing. The computer program may be installed from a program source. The program source may be, for example, a program distribution server or a computer-readable storage medium.

The storage system according to an embodiment of the present specification can mount a device different from the drive by using one or more slots in which the drive can be mounted without separately preparing a dedicated slot or an interface for mounting the device. The drive is a secondary storage medium. Hereinafter, in particular, an embodiment of a storage system equipped with an accelerator and a drive will be described, but the storage system may be equipped with a device different from the accelerator together with the drive. In addition, two or more types of devices different from the drive may be mounted together with the drive.

An accelerator is a dedicated hardware circuit that can alternatively perform some processes that can be performed by a processor of a storage controller. The accelerator may execute, for example, at least part of encoding processing of data stored in the drive. The encoding processing includes, for example, compression processing of data to be written to the drive, decompression processing of compressed data in the drive, encryption processing of data to be written by the drive, and decryption processing of encrypted data in the drive. The accelerator may execute some or all of these encoding processing.

First Embodiment

Hereinafter, embodiments of the present invention will be described using the drawings.

FIG. 1 is a diagram illustrating an example of a configuration of a storage system according to the present embodiment. In the following, different elements of the same type are represented by suffixes different from the same prefix. In addition, one or more elements of the same type may be represented only by a prefix. For example, storage controllers 111-1 and 111-2 indicate different individuals of the same type of storage controller, and a storage controller 111 may represent any one or both of the storage controllers 111-1 and 111-2.

Hosts 102-1 and 102-2 are computer devices that transmit a data read command and a data write command to the storage system 101 on the basis of a user operation or an operation such as application software. Note that the hosts 102-1 and 102-2 may be virtual computer devices such as virtual machines.

In FIG. 1, one host 102-1 or 102-2 is connected to one storage controller 111-1 or 111-2, but a plurality of hosts may be connected to one storage controller.

The storage system 101 has a dual controller configuration in which two storage controllers 111-1 and 111-2 are mounted. In addition, the storage system 101 includes an external drive box 112, drive slots 113-1 to 113-3, and accelerator drive common slots (common slots) 114-1 and 114-2.

The storage controller 111-1 includes a front-end interface (FE IF) 121-1, a back-end interface (BE IF) 122-1, a memory 123-1, a processor (MP) 124-1, an inter-controller interface (inter-CTL IF) 125-1, and a PCIe switch (PCIe SW) 126-1.

The FE IF 121-1 connects the host 102-1 and the storage system 101. The FE IF 121-1 converts a data transfer protocol between the host 102-1 and the storage controller 111-1 and a data transfer protocol in the storage controller 111-1.

The host 102-1 and the FE IF 121-1 are connected via a transmission line such as a fiber channel cable and an Ethernet cable. Note that the host 102-1 and the FE IF 121-1 may be connected via a storage area network including a plurality of transmission lines and a plurality of switches.

The BE IF 122-1 connects the storage controller 111-1 and the drive box 112. The BE IF 122-1 converts a data transfer protocol in the storage controller 111-1 and a data transfer protocol between the storage controller 111-1 and the drive box 112.

In a case where the storage device accommodated in the drive box 112 is a PCIe connected NVMESSD, the BE IF 122-1 is a PCIe switch that does not perform protocol conversion.

The memory 123-1 is a main storage device used by the MP 124-1, and stores information such as a program (for example, a storage control program or the like) executed by the MP 124-1 and a management table referred to by the MP 124-1.

The MP 124-1 controls data transfer between the host 102-1 connected via the FE IF 121-1 and devices connected to the drive box 112 connected via the BE IF 122-1, the drive slots 113-1 to 113-3, and the common slots 114-1 and 114-2. Further, the MP 124-1 controls data transfer between the storage controllers 111.

The inter-CTL IF 125-1 connects the MPs 124-1 and 124-2 included in the storage controllers 111-1 and 111-2.

The PCIe SW 126-1 is a component that relays a high-speed external IO bus, and connects the MP 124-1 and a drive mounted in the drive slots 113-1 to 113-3 or the common slots 114-1 and 114-2.

The storage controller 111-2 includes an FE IF 121-2, a BE IF 122-2, a memory 123-2, an MP 124-2, an inter-CTL IF 125-2, and a PCIe SW 126-2. The same description as that of the storage controller 111-1 can be applied to the storage controller 111-2.

The drive slots 113-1 to 113-3 are slots for inserting a drive built in the storage system 101. Each of the drive slots 113-1 to 113-3 is connected to the PCIe SW 126-1 via a signal line 115-1 and is connected to the PCIe SW 126-2 via a signal line 115-2 by a dual port for improving availability of the storage system.

The signal line 115-1 and the signal line 115-2 indicate lanes that serve as PCIe data transmission routes. Each of the signal lines 115-1 and 115-2 is a band of x2. Therefore, each drive is connected to the storage system 101 in a total of x4 of bandwidth. As a result, even in a case where an abnormality occurs in one of the storage controllers 111-1 and 111-2, any drive can be accessed from the other, and availability is maintained.

The common slots 114-1 and 114-2 are slots that extend the functions of the drive slots 113-1 to 113-3 and allow an accelerator to be mounted in addition to a drive.

Each of the common slots 114-1 and 114-2 is wired so as to be connected to the PCIe SW 126-1 via a signal line 116-1 and to be connected to the PCIe SW 126-2 via a signal line 116-2. The common slot 114-1 is connected to the MP 124-1 of the storage controller 111-1 via a signal line 117-1, and the common slot 114-2 is wired to be connected to the MP 124-2 of the storage controller 111-2 via a signal line 117-2. The signal line 116-1, the signal line 116-2, and the signal lines 117-1 and 117-2 indicate lanes that serve as PCIe data transmission routes.

In a case where a drive is inserted into the common slot 114-1 or 114-2, the common slot behaves in the same manner as in a case where a drive is inserted into any of the drive slots 113-1 to 113-3. That is, in a case where a drive is inserted into the common slot 114-1 or 114-2, the drive is connected to the PCIe SW 126-1 via the signal line 116-1 and is connected to the PCIe SW 126-2 via the signal line 116-2 by a dual port.

Each of the signal lines 116-1 and 116-2 is a band of x2. Therefore, the drive is connected to the storage system 101 in a total of x4 of bandwidth. At this time, the signal line 117-1 or 117-2 connected to the MP 124-1 or 124-2 is not used. Note that the drive may include three or more drive ports and may be connected to different PCIe SWs, and the number of drive ports may be one.

In a case where an accelerator is mounted in the common slot 114-1 or 114-2, the accelerator is connected to the MP 124-1 or 124-2 of one of the storage controller 111-1 or 111-2 via the corresponding signal line 117-1 or 117-2. The signal lines 117-1 and 117-2 are bands of x8 so as to support the processing speed of the accelerator. At this time, the signal lines 116-1 and 116-2 connected to the PCIe SWs 126-1 and 126-2 are not used.

As a result, the storage system 101 can select whether to mount a drive or an accelerator in each common slot of the common slots 114-1 and 114-2. In a case where a drive is mounted in the common slot 114-1 and/or 114-2, the capacity of the storage system is expanded, and in a case where an accelerator is mounted in the common slot 114-1 and/or 114-2, the processing performance of the storage system 101 is improved.

Figure 2:
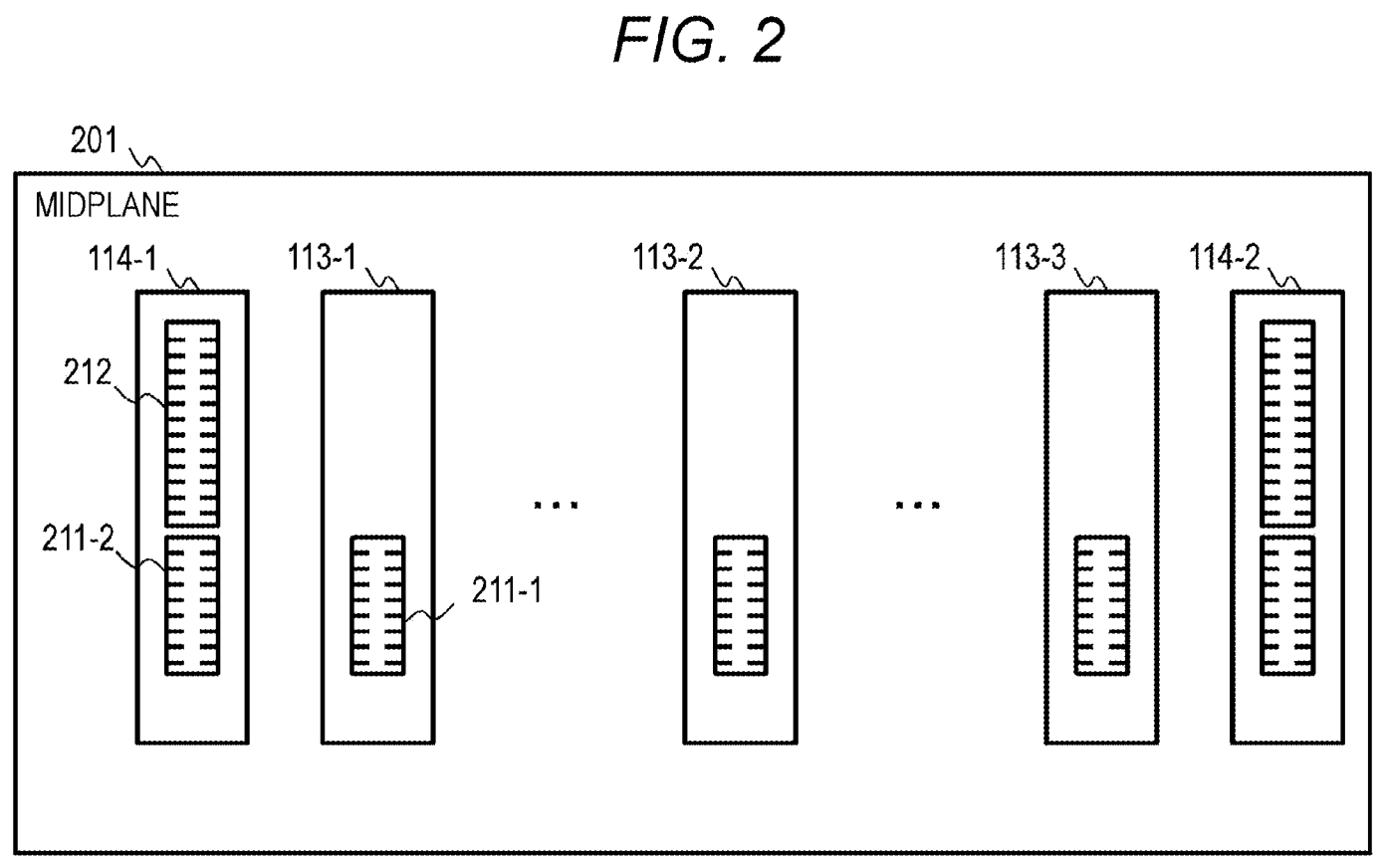

FIG. 2 is a front view of a midplane 201 provided with the drive slot 113 and the common slot 114 in the storage system 101 of FIG. 1.

The midplane 201 includes at least one drive slot 113 and two common slots 114. In the present embodiment, a case where there are two common slots 114 will be described, but the present embodiment is not limited to this example. For example, the midplane 201 may be provided with four common slots 114.

The drive slot 113 includes a drive receptacle connector 211-1 as a connector for connecting a drive. The drive receptacle connector 211-1 is a connector that connects a drive and the drive slot 113 in a case where the drive is mounted in the drive slot 113. The drive receptacle connector 211-1 is connected to the PCIe SW 126 via a signal line 115.

The common slot 114 includes a drive receptacle connector 211-2 having the same configuration and function as those of the drive receptacle connector 211-1 included in the drive slot 113, and an accelerator receptacle connector 212 for mounting an accelerator.

In one embodiment of the present specification, the wiring and position of the drive receptacle connector 211 conform to the standard specification. As a result, a general-purpose drive can be used. The accelerator receptacle connector 212 is disposed at a position that does not interfere with the drive receptacle connector 211-2 in the common slot 114.

The drive receptacle connector 211-2 is connected to the PCIe SW 126 via the signal line 116. The accelerator receptacle connector 212 is connected to the MP 124 via the signal line 117.

Figure 3A:
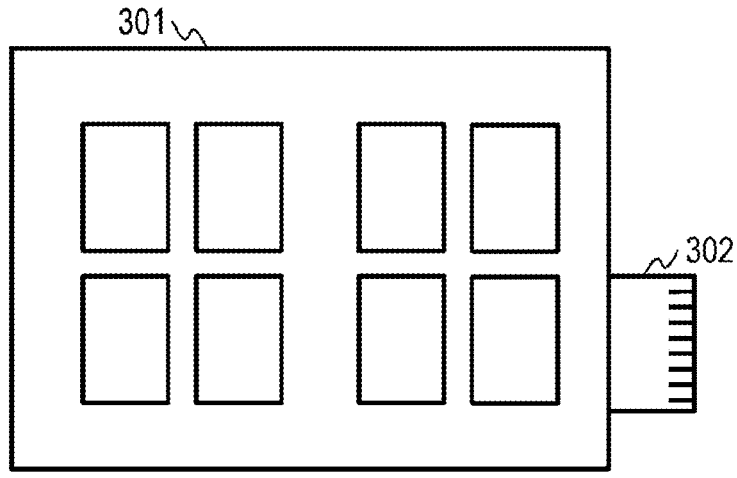
FIG. 3A is a diagram illustrating an exemplary structure of a drive to be inserted into a common slot according to the first embodiment.
Figure 3B:
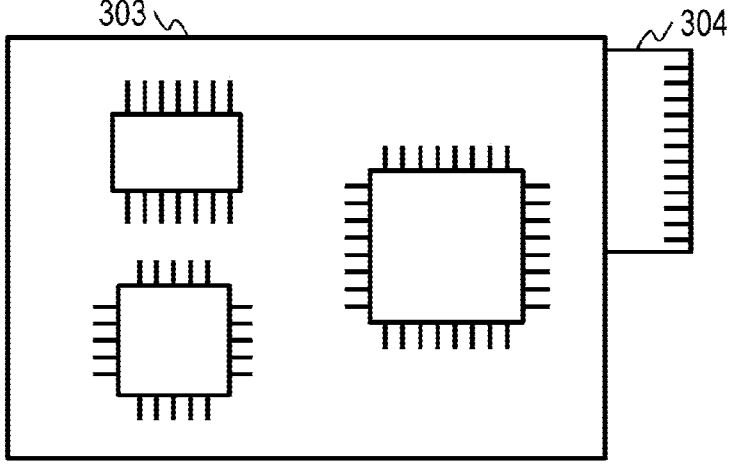
FIG. 3B is a diagram illustrating an exemplary structure of an accelerator to be inserted into the common slot according to the first embodiment.

FIGS. 3A and 3B illustrate examples of various devices connected to each slot of the midplane 201 illustrated in FIG. 2. Specifically, FIG. 3A illustrates an exemplary structure of a drive 301, and FIG. 3B illustrates an exemplary structure of an accelerator 303.

As illustrated in FIG. 3A, the drive 301 is a secondary storage medium such as a solid state drive (SSD). The drive 301 includes a drive plug connector 302 to be inserted into the drive slot 113 or the common slot 114 and connected to the receptacle connector. The drive plug connector 302 is an x4 connector size.

As illustrated in FIG. 3B, the accelerator 303 is a data processing circuit including, for example, a field-programmable gate array (FPGA). The accelerator 303 is equipped with a circuit for executing dedicated processing such as compression and encryption, and can improve the processing performance of the storage system 101 by off-loading a part of the processing executed by the MP 124. The accelerator 303 includes an accelerator plug connector 304 for connection with the common slot 114. The accelerator plug connector 304 is x8 connector size.

Since the accelerator 303 is connected to the accelerator receptacle connector 212 disposed at a special position not conforming to the standard specification, the accelerator plug connector 304 is disposed at a position different from the standard specification using a proprietary board.

Figure 4:
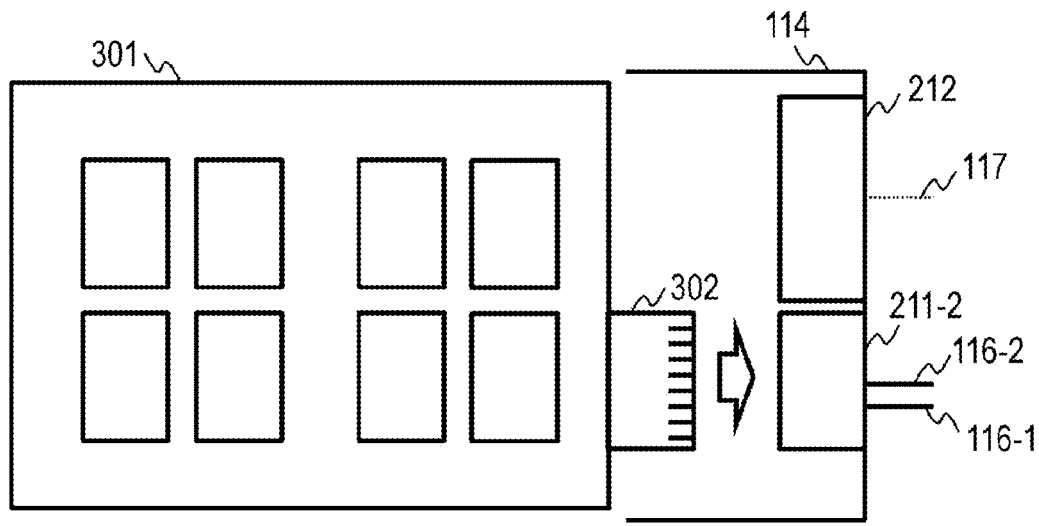
FIG. 4 is a diagram illustrating a state in which a drive is inserted into the common slot according to the first embodiment.

FIG. 4 illustrates a state in which the drive 301 is inserted into the common slot 114 illustrated in FIG. 2. In a case where the drive 301 is inserted into the common slot 114, the drive receptacle connector 211-2 and the drive plug connector 302 of the two receptacle connectors of the common slot 114 are connected. At this time, the accelerator receptacle connector 212 is not used. The drive 301 is connected to the PCIe SW 126-1 via the signal line 116-1 and is connected to 126-2 via the signal line 116-2 by connection of the drive plug connector 302 and the drive receptacle connector 211-2.

Figure 5:
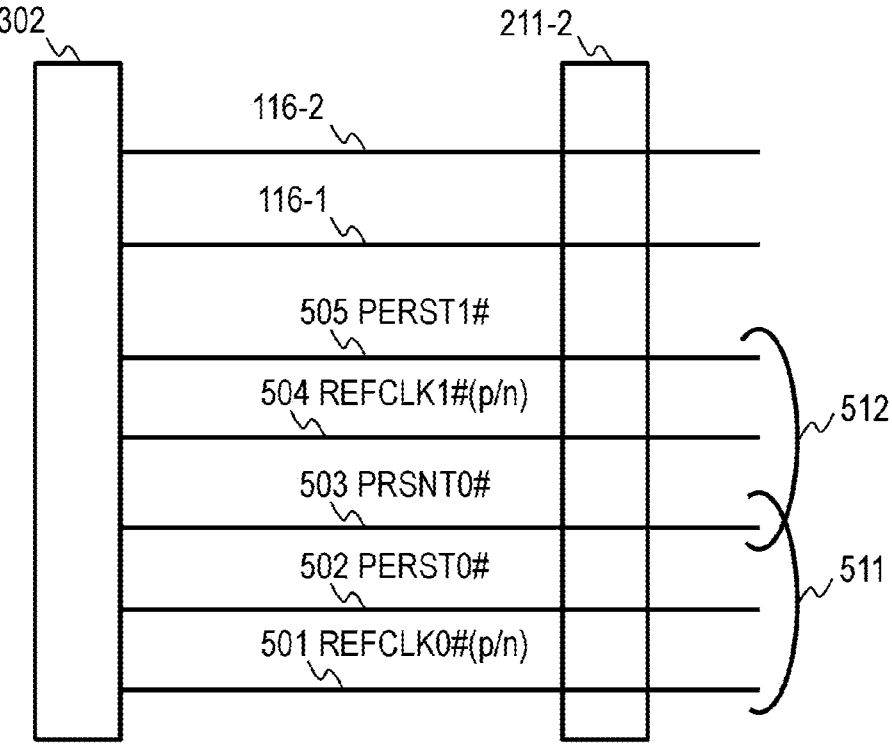
FIG. 5 is a diagram illustrating representative signal lines of PCIe used when a drive plug connector and a drive receptacle connector according to the first embodiment are connected.

FIG. 5 illustrates a representative signal line of PCIe used in a case where the drive plug connector 302 and the drive receptacle connector 211-2 are connected. A signal line 501 and a signal line 504 indicate a reference clock signal (differential) of the PCIe link called REFCLK. The signal line 501 indicates REFCLK0 #, and the signal line 504 indicates REFCLK1 #. A signal line 502 and a signal line 505 are reset signals called PERST, and are signal lines indicating that the power supply and the reference clock are stable. The signal line 502 indicates PERST0 #, and the signal line 505 indicates PERST1 #.

A signal line 503 is a signal called PRSNT and used for detection of a PCIe device. A device that supports an x4 connection connector needs to implement PRSNT0 #. A device that supports an x8 connection connector needs to implement PRSNT0 # and PRSNT1 #. A device that supports an x16 connection connector needs to implement PRSNT0 #, PRSNT1 #, and PRSNT2 #. Since the drive plug connector 302 has an x4 connector size, PRSNT0 # is implemented as the signal line 503.

A set of signals 511 is a set of the signal line 501, the signal line 502, and the signal line 503. The set of signals 511 is used corresponding to the signal line 116-1. Similarly, a set of signal lines 512 is a set of the signal line 504, the signal line 505, and the signal line 503. The set of signal lines 512 is used corresponding to the signal line 116-2.

Figure 6:
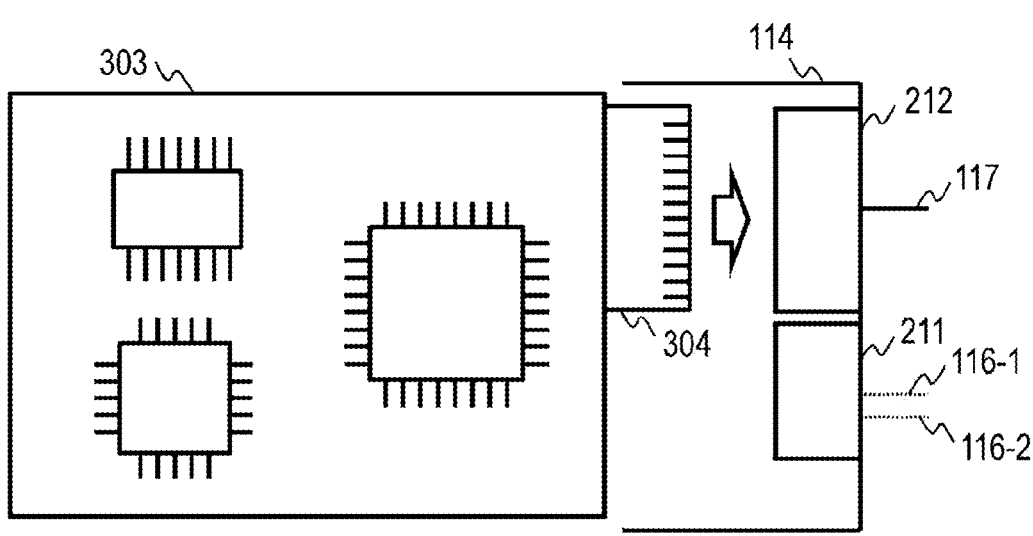
FIG. 6 is a diagram illustrating a state in which an accelerator is inserted into the common slot according to the first embodiment.

FIG. 6 shows how the accelerator 303 is inserted into the common slot 114 provided in the midplane 201 shown in FIG. 2. In a case where the accelerator 303 is inserted into the common slot 114, the accelerator receptacle connector 212 and the accelerator plug connector 304 of the two receptacle connectors included in the common slot 114 are connected. At this time, the drive receptacle connector 211 is not used. The accelerator 303 is connected to the MP 124 of one storage controller 111 via the signal line 117 by connection between the accelerator plug connector 304 and the accelerator receptacle connector 212.

Figure 7:
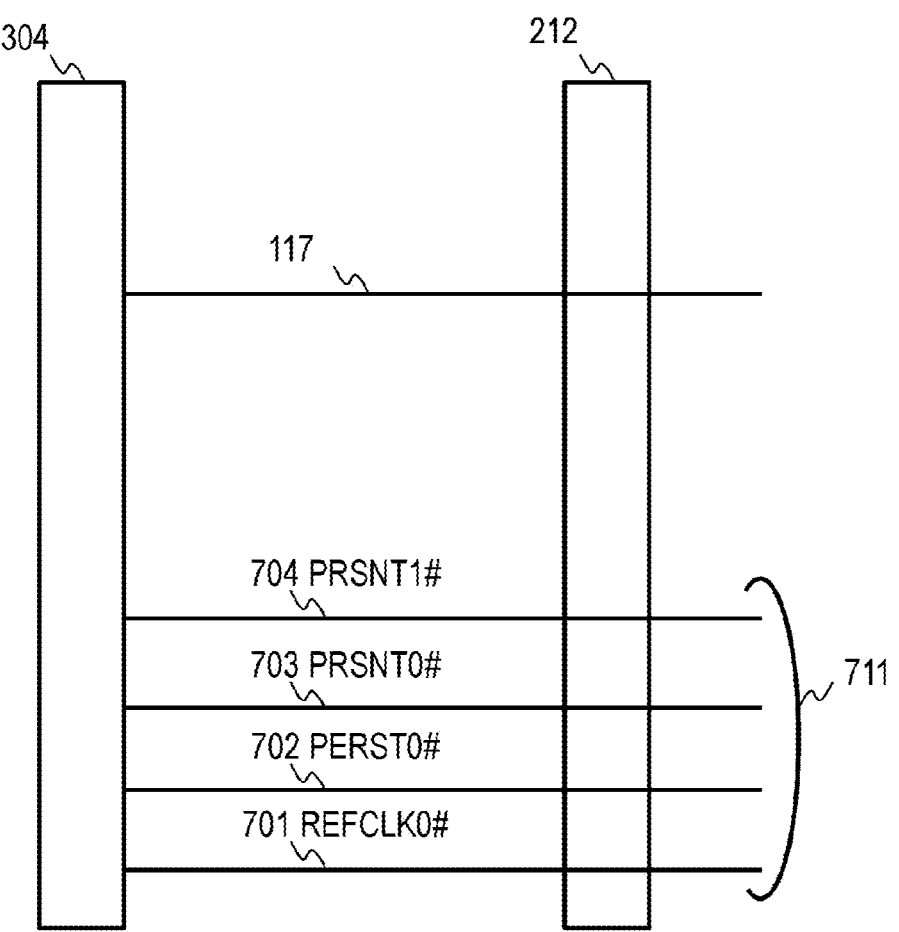
FIG. 7 is a diagram illustrating representative signal lines of PCIe used in a case where an accelerator plug connector and an accelerator receptacle connector according to the first embodiment are connected.

FIG. 7 illustrates a representative signal line of PCIe used when the accelerator plug connector 304 and the accelerator receptacle connector 212 are connected. A signal line 701 indicates REFCLK0 #. A signal line 702 indicates PERST0 #. A signal line 703 indicates PRSNT0 #. A signal line 704 indicates PRSNT1 #.

Since the accelerator plug connector 304 has an x8 connector size, PRSNT0 # is implemented by the signal line 703, and PRSNT1 # is implemented by the signal line 704. A set of signal lines 711 is a set of the signal line 701, the signal line 702, the signal line 703, and the signal line 704. The set of signal lines 711 is used corresponding to the signal line 117.

As described above, in the storage system 101 of the first embodiment, the maximum number of accelerators that can be mounted increases. As a result, the processing performance of the storage system 101 can be improved.

Note that the number of common slots to be mounted is not limited, and may be any value of one or more. In addition, all of the drive slots 113 may be the common slot 114. The description of the first embodiment can be applied to a storage system in which a device different from an accelerator is mounted together with a drive by changing a part as necessary. This point is the same in the other embodiments.

Second Embodiment

In the present embodiment, as a modification of the first embodiment, an example in which the receptacle connectors included in the common slot 114 are unified to one will be described. Since the configuration of the storage system in the present embodiment is similar to that in FIG. 1 of the first embodiment, the description thereof will be omitted.

Figure 8:
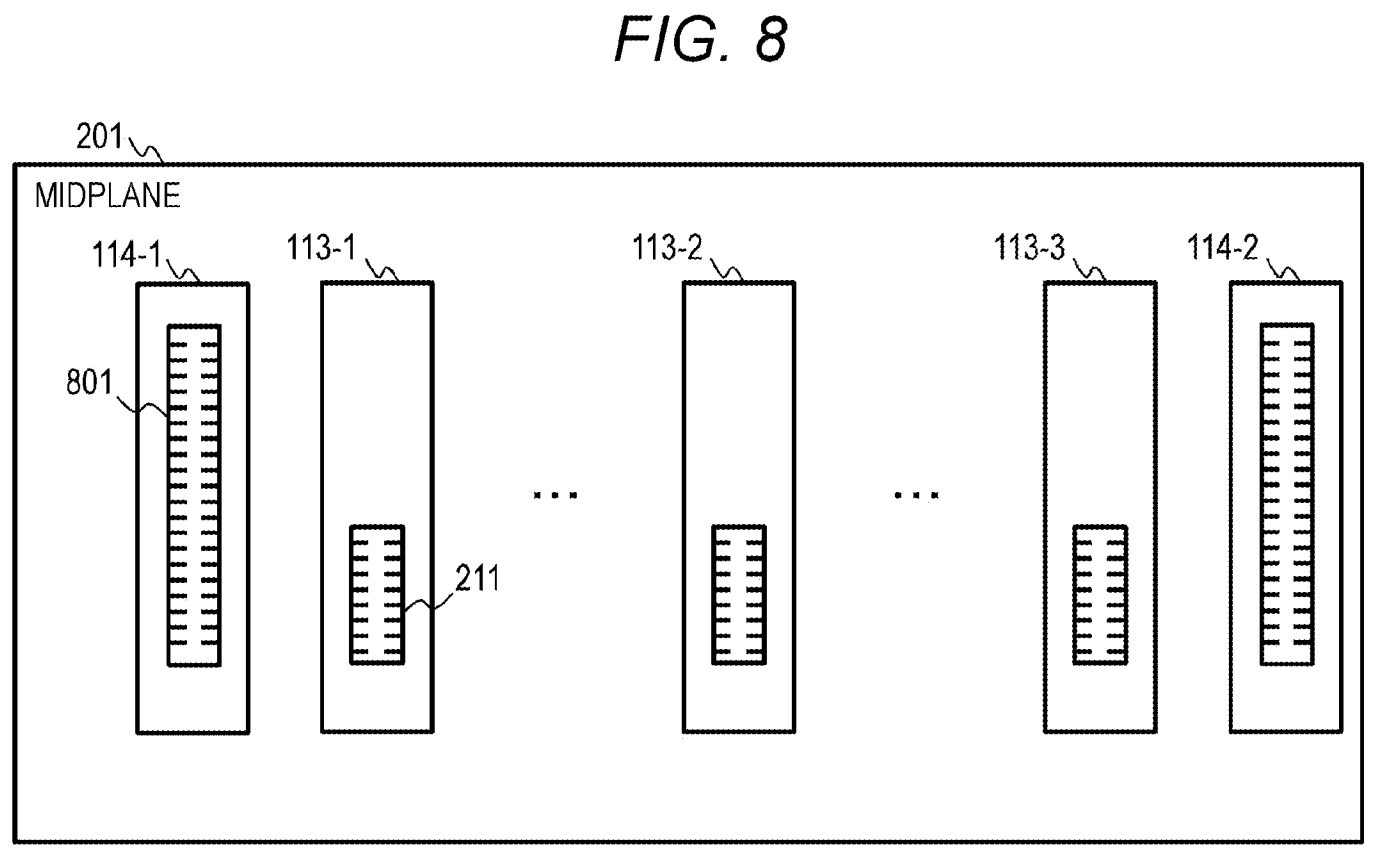

FIG. 8 is a front view of the midplane 201 in the present embodiment included in the storage system 101. The common slot 114 has a common receptacle connector 801 in the present embodiment.

The common receptacle connector 801 is a connector for both a drive and an accelerator that can be connected to either a drive or an accelerator. The common receptacle connector 801 is an x16 size connector, and signal pins of lanes 0 to 3 are assigned to the signal lines 116-1 and 116-2 as drive-dedicated lanes. Further, in the common receptacle connector 801, the signal pins of the lanes 8 to 15 are allocated to the signal line 117 as the accelerator-dedicated lanes.

Figure 9:
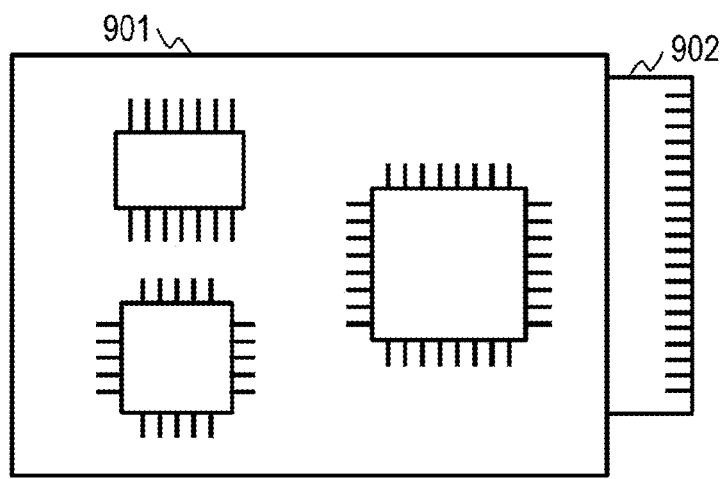
FIG. 9 is a diagram illustrating an example of an accelerator to be inserted into a common slot according to the second embodiment.

FIG. 9 is a diagram illustrating a configuration of an accelerator 901 in the present embodiment. The accelerator 901 has a function equivalent to that of the accelerator 303 illustrated in FIG. 3B, but unlike the accelerator 303, an accelerator plug connector 902 has an x16 connector size.

Figure 10:
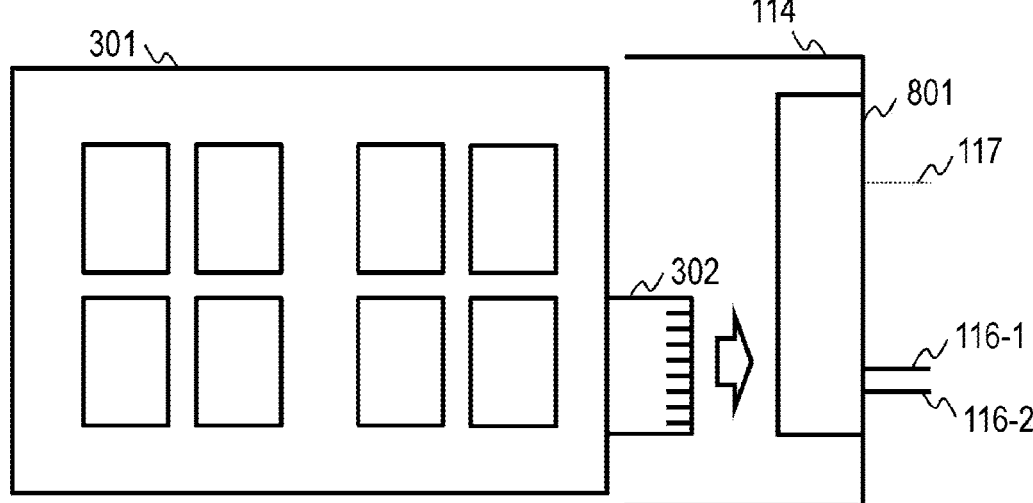
FIG. 10 is a diagram illustrating a state in which a drive is inserted into a common slot according to the second embodiment.

FIG. 10 illustrates a state in which the drive 301 is inserted into the common slot 114 illustrated in FIG. 8. Since the drive 301 is a general-purpose product, the drive plug connector 302 is wired according to the standard specification. The drive plug connector 302 is inserted into the common receptacle connector 801 having an x16 size while maintaining the x4 connector size. The drive plug connector 302 is connected to signal pins of lanes 0 to 3 of the common receptacle connector 801, is connected to the PCIe SW 126-1 via the signal line 116-1, and is connected to the PCIe SW 126-2 via the signal line 116-2.

Figure 11:
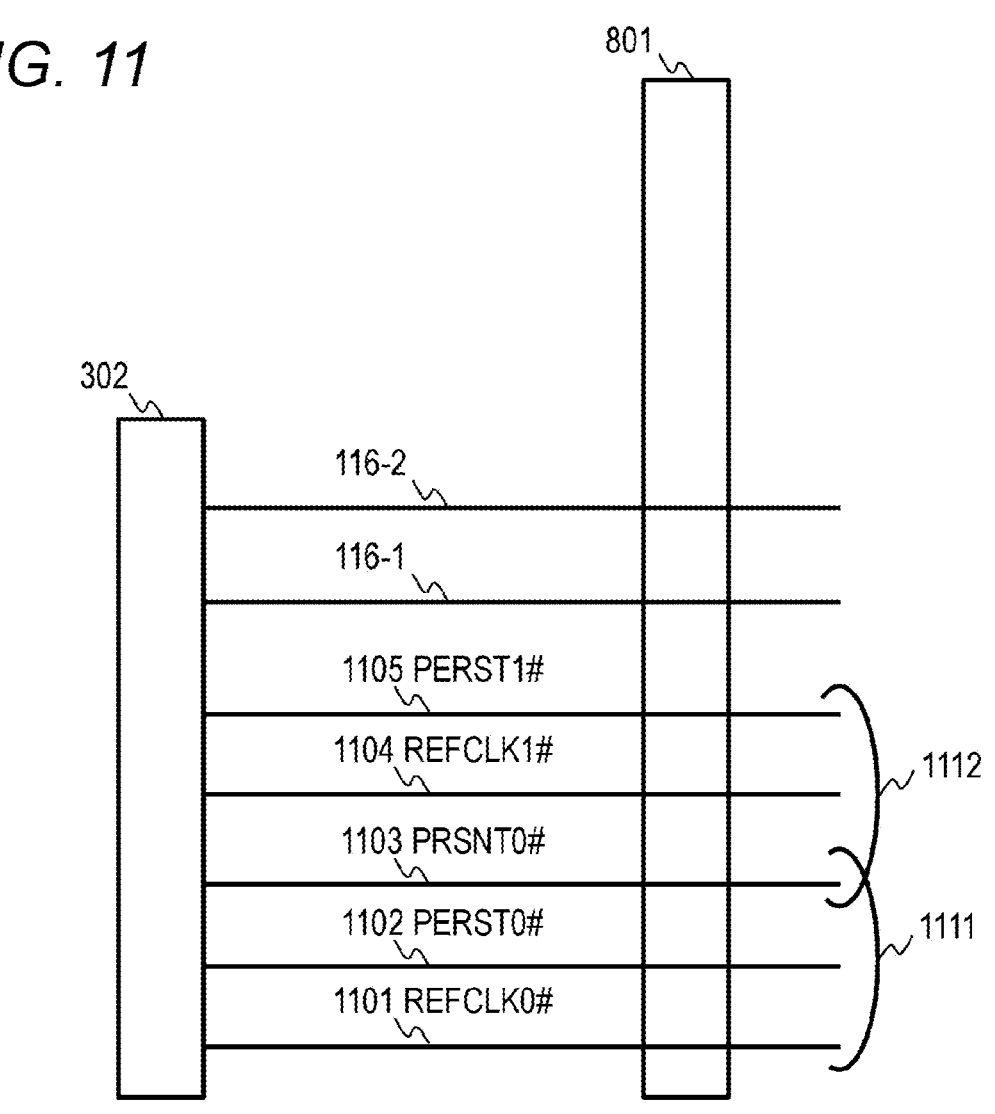
FIG. 11 is a diagram illustrating representative signal lines of PCIe used in a case where the drive plug connector and a common receptacle connector according to the second embodiment are connected.

FIG. 11 illustrates a representative signal line of PCIe used in a case where the drive plug connector 302 and the common receptacle connector 801 are connected. A signal line 1101 indicates REFCLK0 #. A signal line 1102 indicates PERST0 #. A signal line 1103 indicates PRSNT0 #. A signal line 1104 indicates REFCLK1 #. A signal line 1105 indicates PERST1 #.

A set of signal lines 1111 is a set of the signal line 1101, the signal line 1102, and the signal line 1103. The set of signal lines 1111 is used corresponding to the signal line 116-1. A set of signal lines 1112 is a set of the signal line 1103, the signal line 1104, and the signal line 1105. The set of signal lines 1112 is used corresponding to the signal line 116-2.

Figure 12:
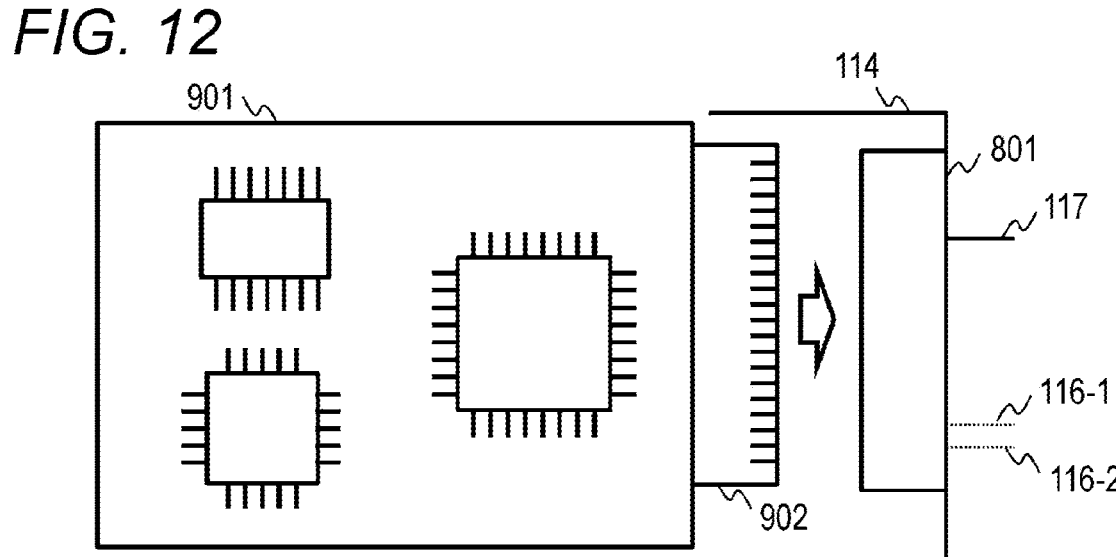
FIG. 12 is a diagram illustrating a state in which an accelerator is inserted into a common slot according to the second embodiment.

FIG. 12 shows how the accelerator 901 is inserted into the common slot 114 illustrated in FIG. 8. In the present embodiment, the accelerator plug connector 902 having an x16 size is connected to the common receptacle connector 801 having an x16 size.

Figure 13:
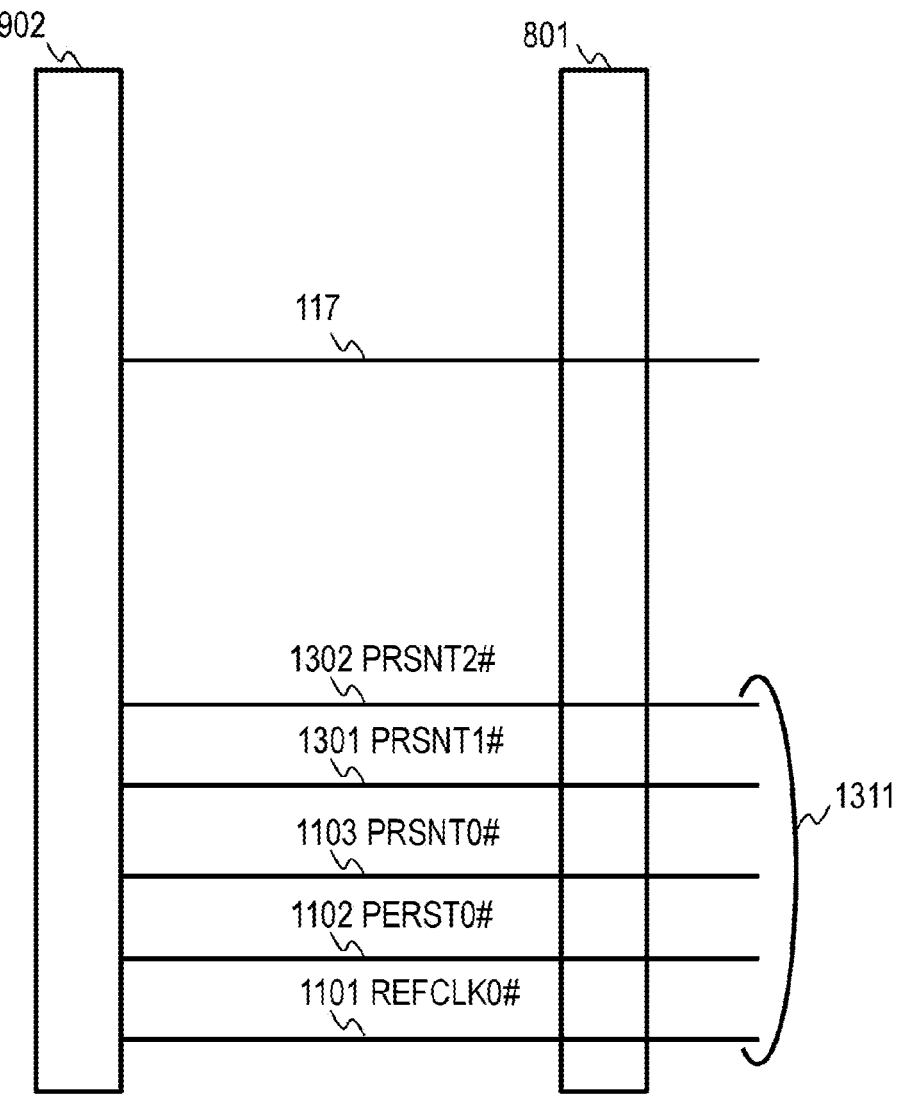
FIG. 13 is a diagram illustrating representative signal lines of PCIe used in a case where an accelerator plug connector and a common receptacle connector according to the second embodiment are connected.

FIG. 13 illustrates a representative signal line of PCIe used in a case where the accelerator plug connector 902 and the common receptacle connector 801 are connected. The signal line 1101, the signal line 1102, and the signal line 1103 are commonly used regardless of whether a drive or an accelerator is connected to the common receptacle connector 801.

A signal line 1301 indicates PRSNT1 #. A signal line 1302 indicates PRSNT2 #. Since the accelerator plug connector 902 has an x16 connector size, PRSNT0 # is implemented by the signal line 1103, PRSNT1 # is implemented by the signal line 1301, and PRSNT2 # is implemented by the signal line 1302. A set of signal lines 1311 is a set of the signal line 1101, the signal line 1102, the signal line 1103, the signal line 1301, and the signal line 1302. The set of signal lines 1311 is used corresponding to the signal line 117.

The accelerator 901 is a device card of a unique design not conforming to the standard specification, and a unique wiring is provided to the accelerator plug connector 902. The accelerator plug connector 902 is wired only to the signal pins of the lanes 8 to 15 and is connected to the common receptacle connector 801 as a substantially x8 plug connector. The accelerator plug connector 902 is connected to signal pins of the lanes 8 to 15 of the common receptacle connector 801, and is connected to the MP 124 of one storage controller 111 via the signal line 117. The mounting position of the connector 902 conforms to the standard specification.

Note that, in a case where the accelerator 901 is connected to the common receptacle connector 801, when it is desired to perform control regarding a side band signal of PCIe different from the drive, signal pins of unused lanes 4 to 8 may be allocated to wiring of the side band signal for the accelerator 901 in the common receptacle connector 801 and the accelerator plug connector 902.

In the present embodiment, by separating wirings (signal pins) of PCIe lanes to be used between the drive and the accelerator, a connection destination is automatically switched depending on a mounted device. In another example, in a case where a PRSNT signal detects insertion of a device into the common slot 114, the PRSNT signal is used, for example, as follows. In the drive 301 using an x4 size plug connector, PRSNT0 # is connected to the ground.

In the accelerator 303 using the plug connector of x16 size, PRSNT0 # is not connected to the ground, and PRSNT1 # and PRNST2 # are connected to the ground. As a result, in a case where the device is inserted into the common slot 114, it is possible to detect that the drive 301 is inserted when PRSNT0 # is at the low level, and detect that the accelerator 303 is inserted when PRSNT1 # and PRSNT2 # are at the low level.

According to the second embodiment, the receptacle connectors included in the common slot 114 are unified to x16 size connectors, and the drive and the accelerator can be connected to the common receptacle connector. Note that the connector of the first embodiment and the connector of the second embodiment may be mounted in one storage system.

Third Embodiment

In the present embodiment, an example will be described in which the connector size is mounted with x8 while the number of receptacle connectors included in the common slot 114 is kept one. In the implementation of the present embodiment, the back end wiring at the time of drive connection and the back end wiring at the time of accelerator connection are partially shared by using the selector for the back end wiring.

Since the basic configuration of the storage system in the present embodiment is similar to that of the first embodiment, the description thereof will be omitted. However, in the present embodiment, the back end of the storage system 101 will be described later with reference to FIG. 20.

Figure 14:
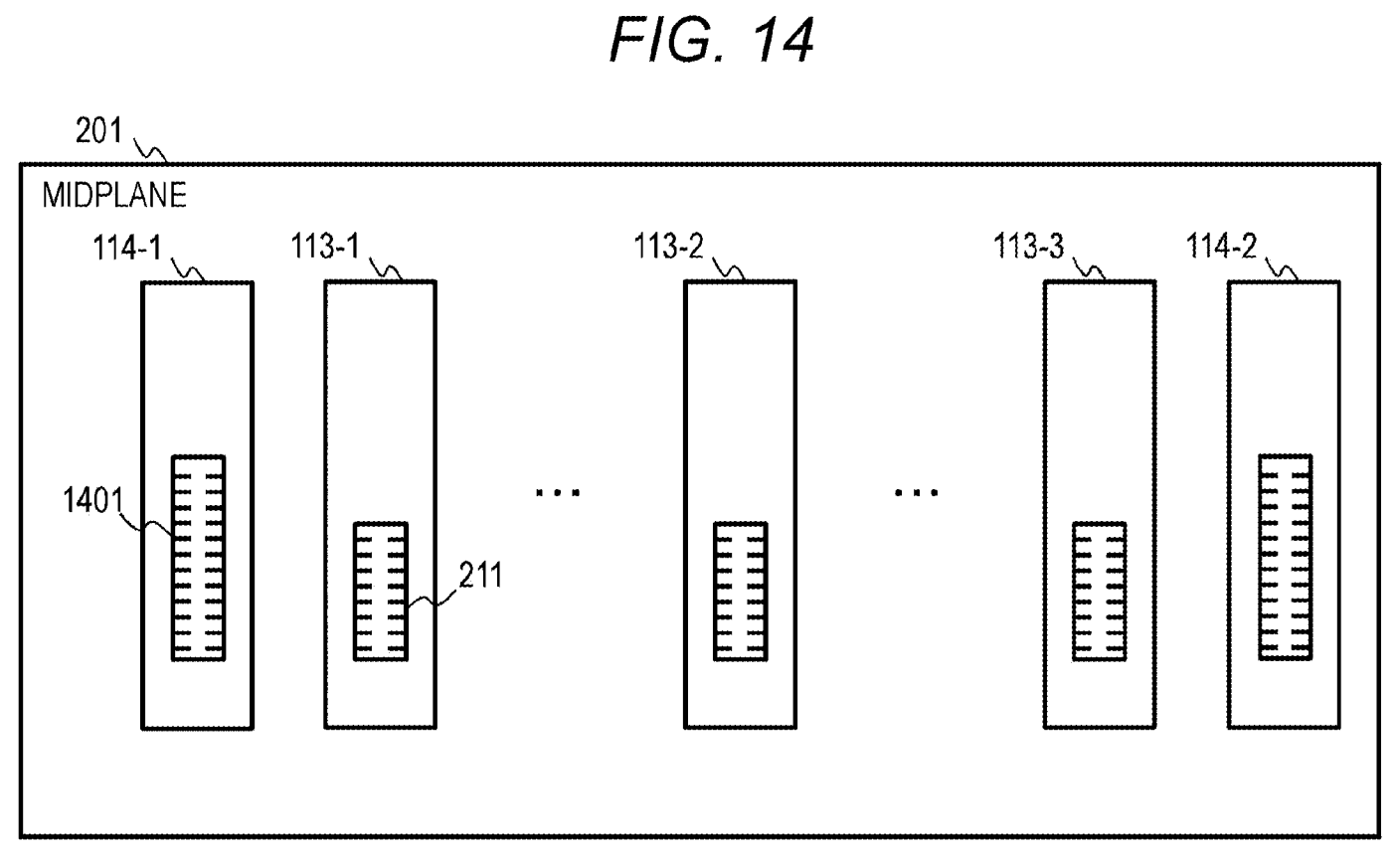

FIG. 14 is a front view of the midplane 201 in the present embodiment included in the storage system 101. The common slot 114 includes a common receptacle connector 1401 in the present embodiment. The common receptacle connector 1401 is an x8 receptacle connector that can be connected to either a drive or an accelerator.

Figure 15:
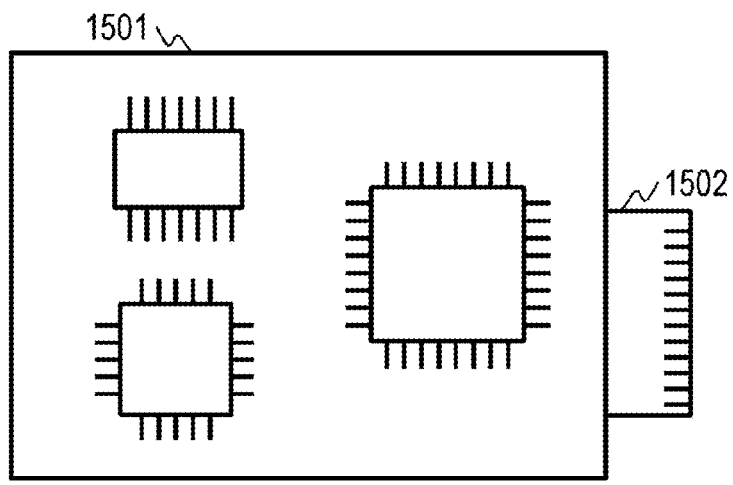
FIG. 15 is a diagram illustrating an example of an accelerator to be inserted into a common slot according to the third embodiment.

FIG. 15 is a diagram illustrating a configuration of an accelerator 1501 in the present embodiment. The accelerator 1501 has an accelerator plug connector 1502. The accelerator plug connector 1502 is an x8 size plug connector. However, unlike the first embodiment, the accelerator plug connector 1502 is disposed at a position conforming to the standard of the EDSFF device. This is because in the present embodiment, since the drive and the accelerator are connected to the same receptacle connector, it is not necessary to separately shift the position of the receptacle connector for connecting the accelerator as in the first embodiment.

Figure 16:
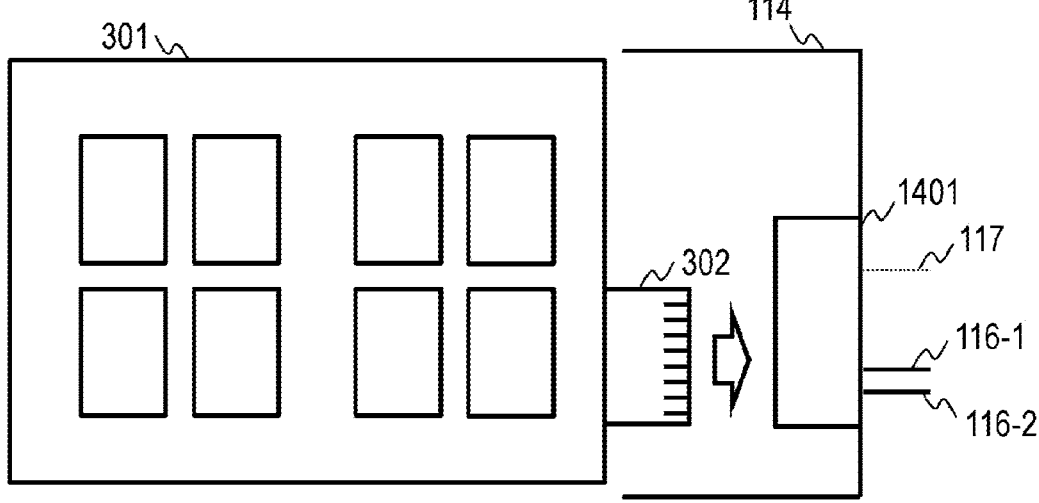
FIG. 16 is a diagram illustrating a state in which a drive is inserted into a common slot according to the third embodiment.

FIG. 16 illustrates a state in which the drive 301 is inserted into the common slot 114 illustrated in FIG. 14. The drive plug connector 302 is inserted into the common receptacle connector 1401 having an x8 size with the plug connector size of x4.

Figure 17:
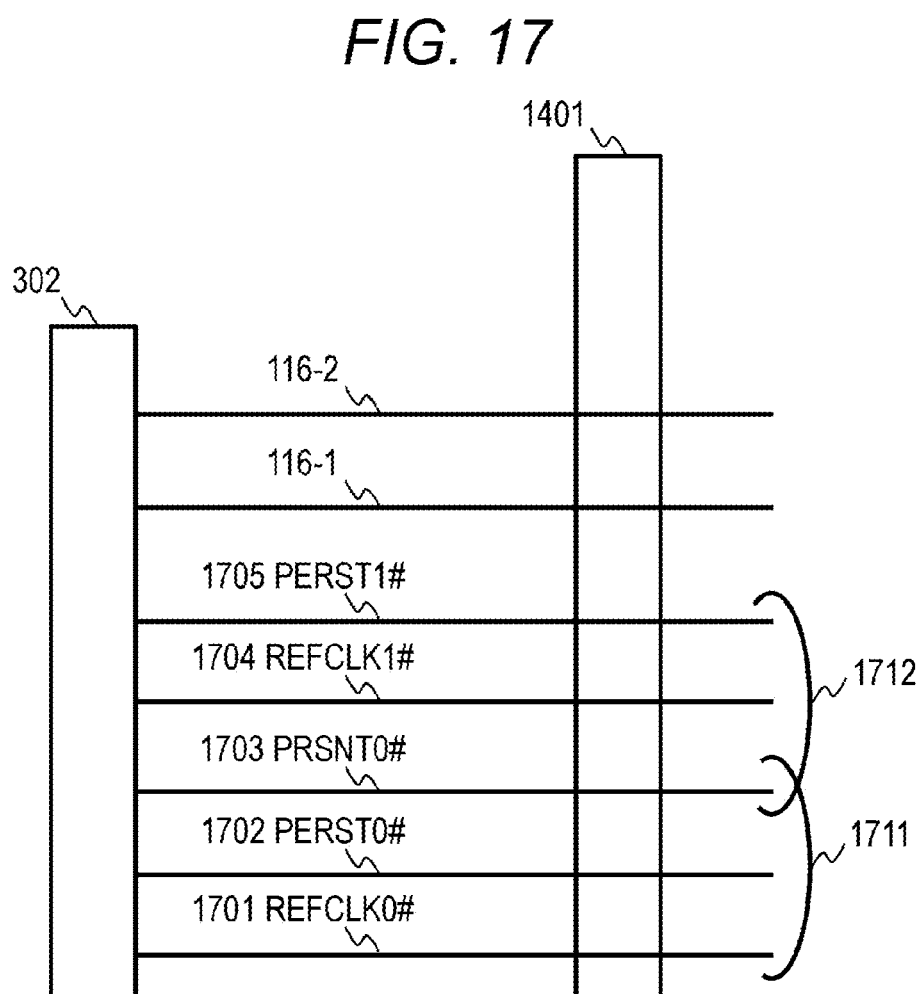
FIG. 17 is a diagram illustrating representative signal lines of PCIe used in a case where the drive plug connector and a common receptacle connector according to the third embodiment are connected.

FIG. 17 illustrates a representative signal line of PCIe used when the drive plug connector 302 and the common receptacle connector 1401 are connected. A signal line 1701 indicates REFCLK0 #. A signal line 1702 indicates PERST0 #. A signal line 1703 indicates PRSNT0 #. A signal line 1704 indicates REFCLK1 #. A signal line 1705 indicates PERST1 #.

A set of signal lines 1711 is a set of the signal line 1701, the signal line 1702, and the signal line 1703. The set of signal lines 1711 is used corresponding to the signal line 116-1. A set of signal lines 1712 is a set of the signal line 1703, the signal line 1704, and the signal line 1705. The set of signal lines 1712 is used corresponding to the signal line 116-2.

Figure 18:
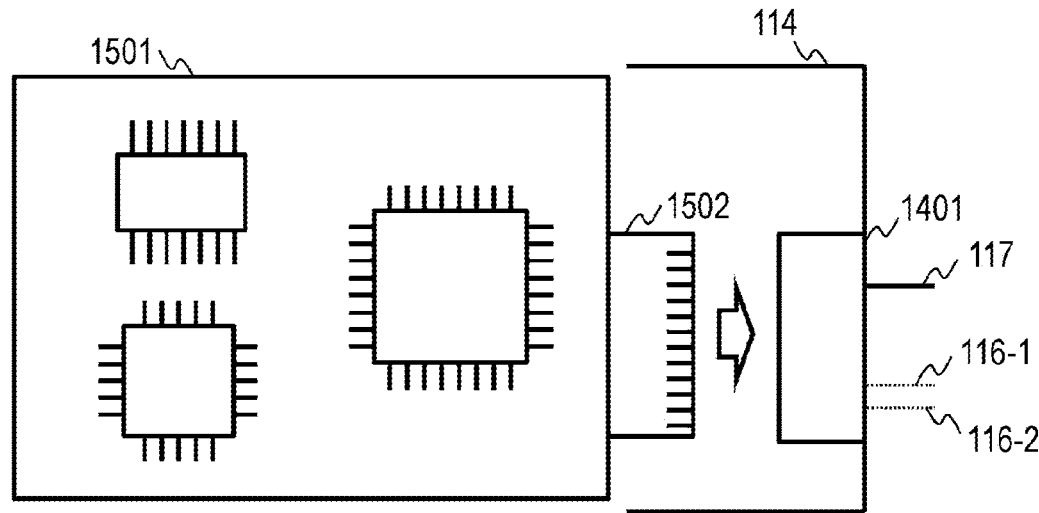
FIG. 18 is a diagram illustrating a state in which an accelerator is inserted into the common slot according to the third embodiment.

FIG. 18 illustrates how the accelerator 1501 is inserted into the common slot 114 illustrated in FIG. 14. In the present embodiment, the accelerator plug connector 1502 having an x8 size is connected to the common receptacle connector 1401 having an x8 size.

Figure 19:
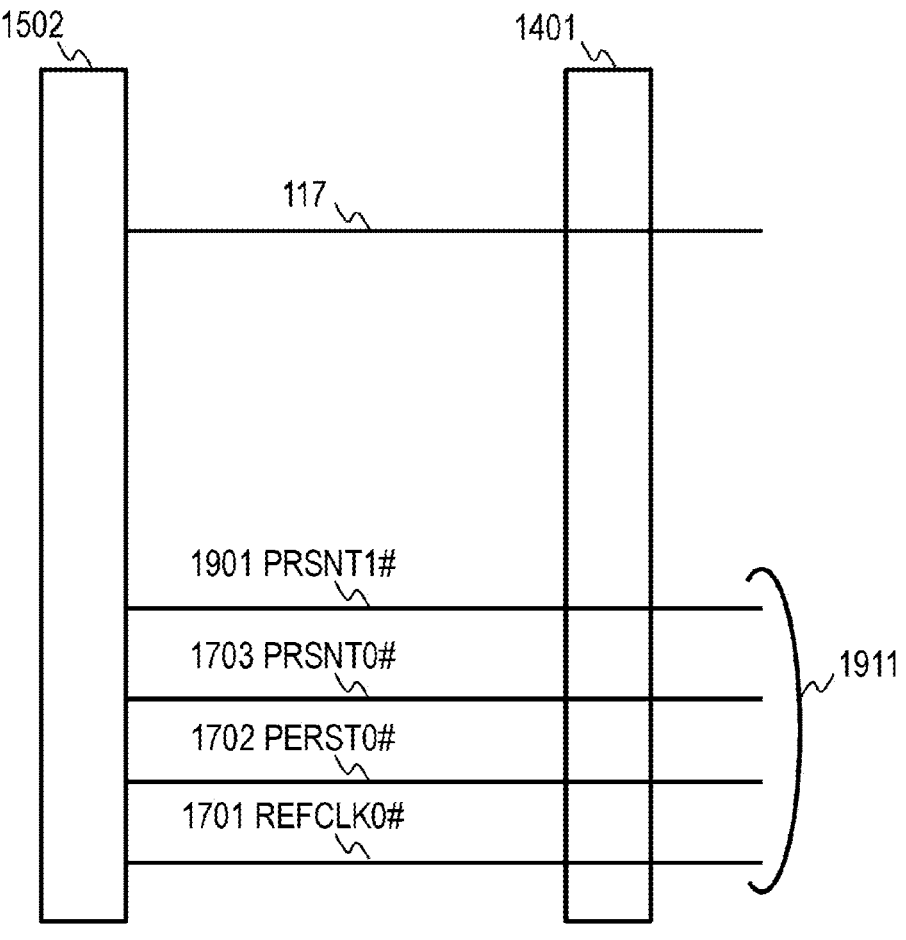
FIG. 19 is a diagram illustrating representative signal lines of PCIe used in a case where an accelerator plug connector and a common receptacle connector according to the third embodiment are connected.

FIG. 19 illustrates a representative signal line of PCIe used in a case where the accelerator plug connector 1502 and the common receptacle connector 1401 are connected. The signal line 1701, the signal line 1702, and the signal line 1703 are commonly used regardless of whether a drive or an accelerator is connected to the common receptacle connector 1401. A signal line 1901 indicates PRSNT1 #.

Since the accelerator plug connector 1502 has an x8 connector size, PRSNT0 # is implemented by the signal line 1703, and PRSNT1 # is implemented by the signal line 1901. A set of signal lines 1911 is a set of the signal line 1701, the signal line 1702, the signal line 1703, and the signal line 1901. The set of signal lines 1911 is used corresponding to the signal line 117.

Figure 20:
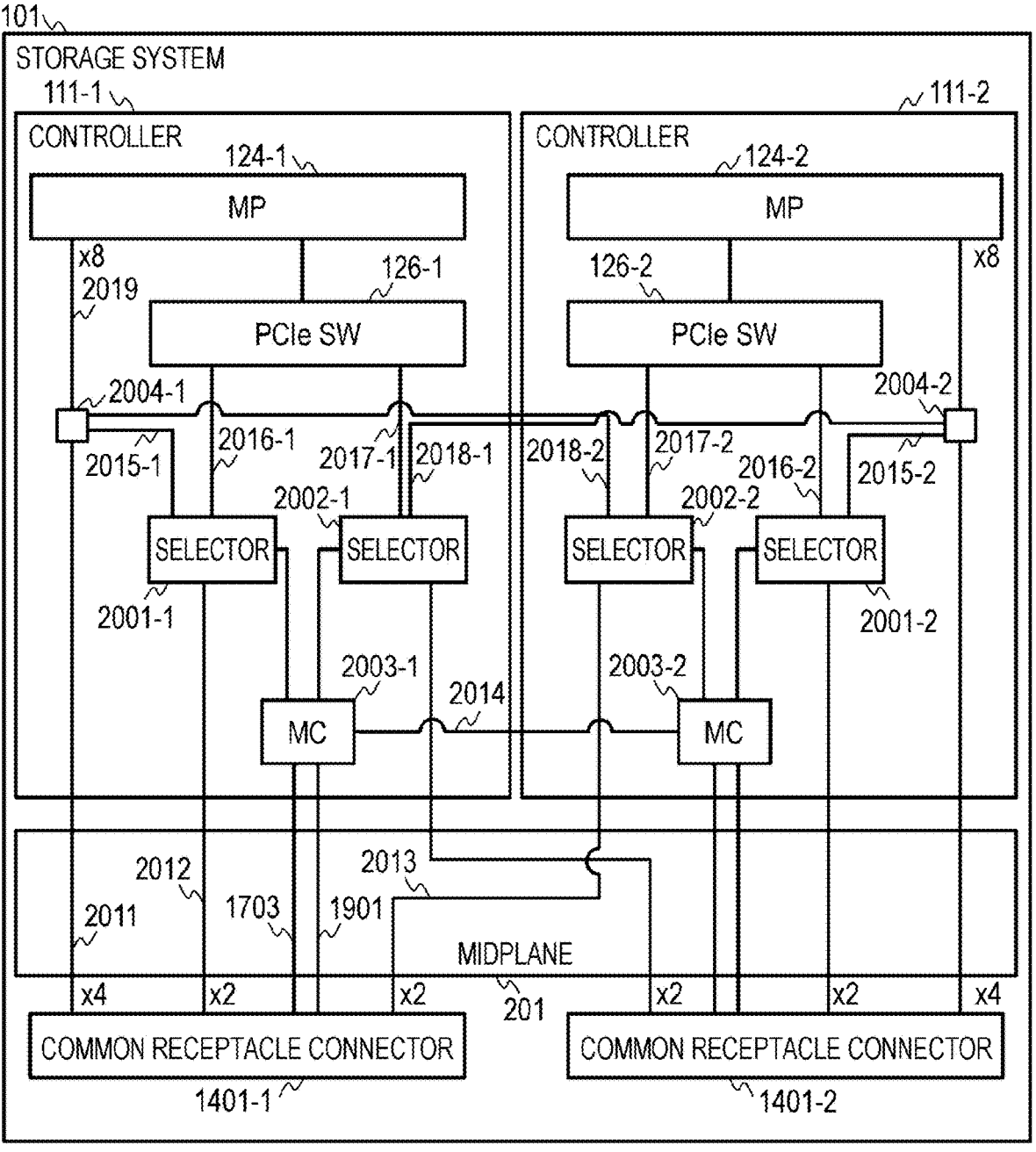
FIG. 20 is a diagram illustrating details of back-end wiring of the storage system according to the third embodiment.

FIG. 20 is a block diagram illustrating, in detail, wirings through which the common receptacle connector 1401 is connected to the MP 124 and the PCIe SW 126. Hereinafter, a case where the device is connected to a common receptacle connector 1401-1 will be assumed. In the configuration example illustrated in FIG. 20, two common receptacle connectors 1401-1 and 1401-2 are mounted. In each common receptacle connector 1401, a signal line 2011, a signal line 2012, a signal line 2013, a signal line 1703, and a signal line 1901 are wired.

The signal line 2011 is an x4 transmission route that is part of the x8 connection of the accelerator 1501 to the MP 124 in a case where the accelerator 1501 is connected to the common receptacle connector 1401. In a case where the drive 301 is connected to the common receptacle connector 1401, the signal line 2011 is not used.

The signal line 2012 and the signal line 2013 are signal lines used even in a case where either the drive 301 or the accelerator 1501 is connected to the common receptacle connector 1401. Each of the signal lines 2012 and 2013 is an x2 transmission route.

In a case where the drive 301 is mounted on the common receptacle connector 1401-1, the signal line 2012 is connected to a signal line 2016-1 by a selector 2001-1 and is connected to the PCIe SW 126-1. At this time, the signal line 2013 is connected to a signal line 2017-2 by a selector 2002-2 and is connected to the PCIe SW 126-2.

In a case where the accelerator 1501 is connected to the common receptacle connector 1401-1, the signal line 2012 is connected to a signal line 2015-1 by the selector 2001-1 and joins a confluence point 2004-1. At this time, the signal line 2013 is connected to a signal line 2018-2 by the selector 2002-2 and joins the confluence point 2004-1. As a result, the accelerator 1501 is connected to the MP 124 with x8 by a signal line 2019.

The storage controller 111 includes a selector 2001, a selector 2002, and a control microcomputer (MC) 2003 in addition to the MP 124 and the PCIe SW 126. In the configuration example illustrated in FIG. 2, two MCs 2003-1 and 2003-2 are mounted.

The MC 2003 has a function of identifying a connected device from PRSNT0 # transmitted via the signal line 1703 and PRSNT1 # transmitted via the signal line 1901 in a case where the device is connected to the common receptacle connector 1401. The function of the MC 2003 may be realized in a form in which the function is built in the PCIe SW 126.

The MCs 2003-1 and 2003-2 communicate with each other via a signal line 2014 what the identified connection device is for the common receptacle connectors 1401-1 and 1401-2 to which they are connected.

The MC 2003-1 transmits the identification result of the device connected to the common receptacle connector 1401-1 to the selector 2001-1. Further, the MC Further, 2003-1 transmits the identification result of the device of the common receptacle connector 1401-2 transmitted from the MC 2003-2 to the selector 2002-1. The MC 2003-2 operates similarly to the MC 2003-1, and transmits the connection device identification result of the common receptacle connector 1401-2 to a selector 2001-2. Further, the MC 2003-2 transmits the identification result of the device of the common receptacle connector 1401-1 transmitted from the MC 2003-1 to the selector 2002-2.

The selector 2001 and the selector 2002 have a function of recognizing a device inserted into the common receptacle connector 1401 on the basis of information transmitted from the MC 2003 and switching a signal line to be used on the basis of the device. The function of the selector 2001 and the selector 2002 are realized by, for example, an analog switch having a function of a demultiplexer.

The selector 2001 has a function of switching the connection destination of the signal line 2012 extending from the common receptacle connector 1401 to either the signal line 2015 or the signal line 2016. For example, in a case where the drive 301 is connected to the common receptacle connector 1401-1, the selector 2001-1 switches the wiring to the signal line 2016-1 to connect to the PCIe SW 126-1. In a case where the accelerator 1501 is connected to the common receptacle connector 1401-1, the selector 2001-1 switches the wiring to the signal line 2015-1 for connection to the MP 124-1 via the confluence point 2004-1.

Similarly, in a case where the drive 301 is connected to the common receptacle connector 1401-2, the selector 2001-2 switches the wiring to the signal line 2016-2 for connection to the PCIe SW 126-2. In a case where the accelerator 1501 is connected to the common receptacle connector 1401-2, the selector 2001-2 switches the wiring to the signal line 2015-2 for connection to the MP 124-2 via the confluence point 2004-2.

The selector 2002 has a function of switching the connection destination of the signal line 2013 extending from the common receptacle connector to either a signal line 2017 or a signal line 2018. For example, in a case where the drive 301 is connected to the common receptacle connector 1401-1, the selector 2002-2 switches the wiring to the signal line 2017-2 for connection to the PCIe SW 126-2. In a case where the accelerator 1501 is connected to the common receptacle connector 1401-1, the selector 2002-2 switches the wiring to the signal line 2018-2 for connection to the MP 124-1 via the confluence point 2004-1.

Similarly, in a case where the drive 301 is connected to the common receptacle connector 1401-2, the selector 2002-1 switches the wiring to the signal line 2017-1 for connection to the PCIe SW 126-1. In a case where the accelerator 1501 is connected to the common receptacle connector 1401-2, the selector 2002-1 switches the wiring to a signal line 2018-1 for connection to the MP 124-2 via a confluence point 2004-2.

The confluence point 2004 is a point for convenience of joining three signal lines of the signal line 2011 extending from the common receptacle connector 1401, the signal line 2015 extending from the selector 2001, and the signal line 2018 extending from the selector 2002, and does not include an element. When the signal lines join at the confluence point 2004, the number of lanes of the signal line 2019 between the MP 124 and the confluence point 2004 becomes 8.

As described above, in FIG. 20, a transmission route of x2 following the signal line 2016 from the signal line 2012 corresponds to the signal line 116-1 in FIG. 1. These signal lines function as a data transmission route connecting the drive 301 and the PCIe SW 126-1 in a case where the drive 301 is mounted in the common slot 114.

Similarly, in FIG. 20, a transmission route of x2 following the signal line 2017 from the signal line 2013 corresponds to the signal line 116-2 in FIG. 1. These signal lines function as a data transmission route connecting the drive 301 and the PCIe SW 126-2 in a case where the drive 301 is mounted in the common slot 114.

Similarly, in FIG. 20, a data transmission route for x8 including the transmission route of x4 of the signal line 2011, the transmission route of x2 following the signal line 2015 from the signal line 2012, the transmission route of x2 following the signal line 2018 from the signal line 2013, and the signal line 2019 in which these signal lines merge corresponds to the signal line 117 in FIG. 1. These signal lines function as a data transmission route for connecting the accelerator 1501 and the MP 124 in a case where the accelerator 1501 is connected to the common receptacle connector 1401.

In addition, the MC 2003 has a function of performing heart beat between the MCs 2003 of each storage controller 111. For example, in a case where an abnormality occurs in the storage controller 111-2 and there is no response from the counterpart MC 2003-2, the connection device of the common receptacle connector 1401-2 to which the MC 2003-2 is responsible for device identification becomes unknown. In this case, the MC 2003-1 switches the wiring instruction of the selector 2002-1 to the drive connection side. As a result, in a case where the drive 301 is connected to the common receptacle connector 1401-2, even if an abnormality occurs in the storage controller 111-2, the availability of access from the storage controller 111-1 to the drive 301 is maintained.

Figure 21:
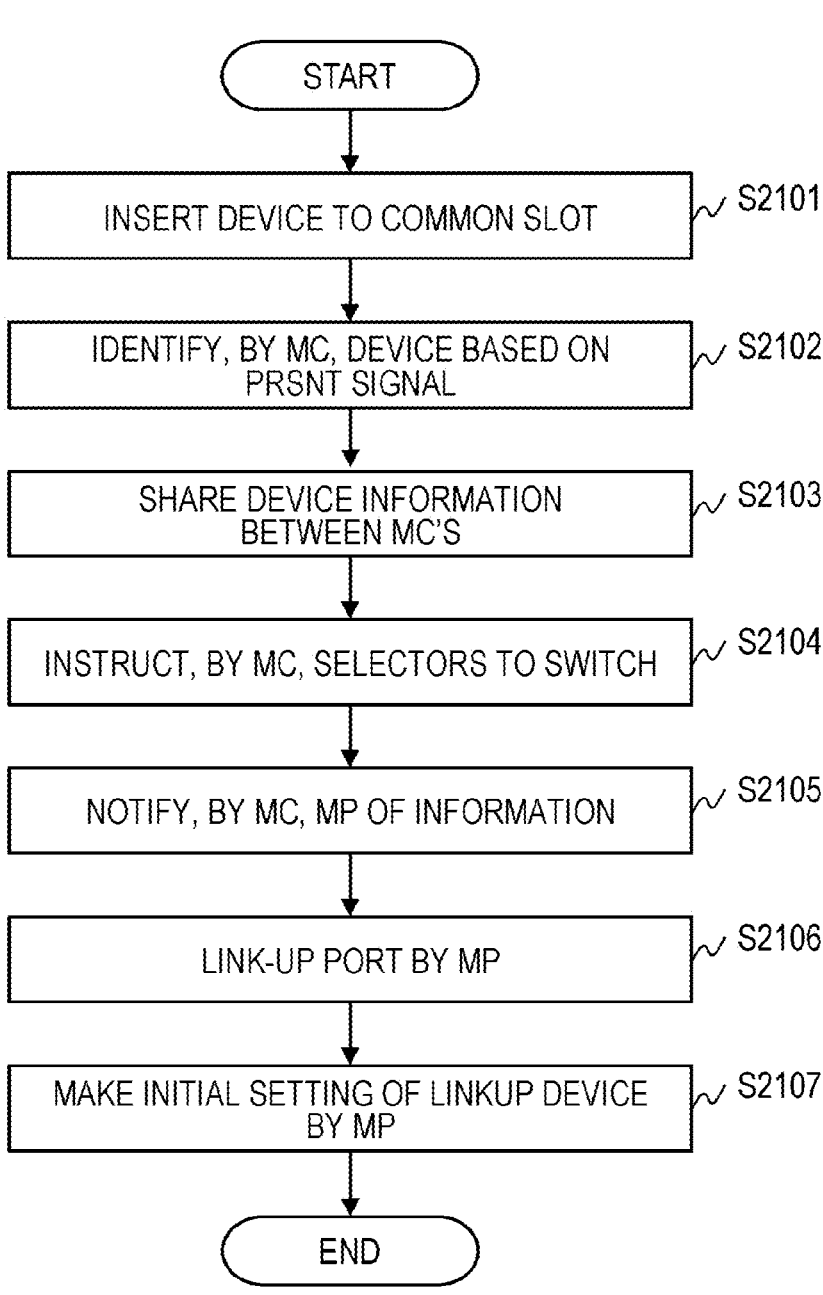
FIG. 21 is a flowchart illustrating a process from when a device is inserted into a common slot to when the device becomes available according to the third embodiment.

FIG. 21 is a flowchart illustrating an example of a process from insertion of a device into the common slot 114 to start of using the device. Here, a description will be given assuming that, as an initial state, in a state where no device is inserted into the common slot 114, the port of the PCIe SW 126 at the connection destination of the drive 301 and the root port of the MP 124 at the connection destination of the accelerator 1501 is connected are both in a link-down state.

First, the maintenance engineer or the like inserts the drive 301 or the accelerator 1501 into the common slot 114 (step S2101).

The MC 2003 detects insertion of the device into the common slot 114 and identifies the device type by reading the PRSNT signal (step S2102). For example, in a case where PRSNT #0 is at the low level and PRSNT #1 is open, the MC 2003 recognizes that the drive 301 has been inserted since the device is connected by x4. When both the PRSNT #0 and the PRSNT #1 are at the low level, the MC 2003 recognizes that the accelerator 1501 is inserted since the device is connected by x8.

The MC 2003 shares the information of the device type identified in step S2102 with the counterpart MC 2003 (step S2103). For example, in a case where a device is inserted into the common slot 114-1, the MC 2003-1 identifies the device type and shares the information with the MC 2003-2.

The MC 2003 issues a wiring switching instruction to the selector 2001 and the selector 2002 on the basis of the information of the device type identified in step S2002 (step S2104).

For example, in a case where the drive 301 is inserted into the common slot 114-1, the MC 2003-1 identifies the device type as a drive, shares the information with the MC 2003-2, and further instructs the selector 2001-1 to switch to the signal line 2016-1. The MC 2003-2 instructs the selector 2002-2 to switch to the signal line 2017-2 on the basis of the information of the device type shared from the MC 2003-1.

In a case where the accelerator 1501 is inserted into the common slot 114-1, the MC 2003-1 identifies the device type as an accelerator, shares that information with the MC 2003-2, and further instructs the selector 2001-1 to switch to the signal line 2015. The MC 2003-2 instructs the selector 2002-2 to switch to the signal line 2018-2 on the basis of the information of the device type shared from the MC 2003-1.

When confirming that the wiring of the selector 2001 and the selector 2002 is switched, the MC 2003 notifies the MP 124 of the switching together with the device information (step S2105). An example of the notification method is as follows. The MC 2003 writes the information indicating that the wiring preparation of the selector 2001 and the selector 2002 is completed and the device identification information to a predetermined address of the memory 123, and transmits an interrupt to the MP 124.

Upon receiving the notification from the MC 2003, the MP 124 links up the designated port on the basis of the mounted device identification information and the wiring switching information (step S2106).

An example of the linkup processing by the MP 124 is as follows. In a case where the notified device information is the drive 301, the MP 124 writes a linkup instruction to a predetermined register of the PCIe SW 126, and the PCIe SW 126 receives the instruction and performs the linkup processing of a designated port. In a case where the notified device information is the accelerator 1501, the MP 124 performs the linkup processing of the port corresponding to the signal line 2019.

After the predetermined port is linked up, the MP 124 makes initial setting of the corresponding device (step S2107).

According to the third embodiment, since the common slot 114 has one common receptacle connector of an x8 size, both the drive and the accelerator can be mounted.

The present invention is not limited to the embodiments described above, but includes various modifications. For example, the above-described embodiments have been described in detail for easy understanding of the present invention, and are not necessarily limited to having those all the described configurations. Some of the configurations of a certain embodiment may be replaced with the configurations of the other embodiments, and the configurations of the other embodiments may be added to the configurations of the subject embodiment. It is possible to add, delete, and replace other configurations for a part of the configuration of each embodiment.

In addition, some or all of the configurations, functions, and processing units may be realized in hardware such as an integrated circuit. The configurations and the functions may be realized in software such that a processor analyzes and performs a program which realizes each function. The information of programs, tables, files to realize the functions may be stored in a memory, a recording device such as a hard disk, an SSD, or a recording medium such as an IC card and an SD card.

The control lines and the information lines are illustrated which are considered as necessary for explanation, and it does not mean that all the control lines and the information lines are necessarily illustrated for a product. In practice, almost all the configurations may be connected to each other.

What is claimed is:

1. A storage system comprising:
a plurality of drive slots into which a drive storing data is insertable; and
one or more controllers including a processor,
wherein at least a part of the plurality of drive slots is a common slot into which a first device of a different type from the drive is insertable, and
a port of the controller at a connection destination of the drive from the common slot and a port of the controller at a connection destination of the first device from the common slot are different,
a first controller and a second controller; and
a first common slot and a second common slot,
wherein the first common slot includes a first common receptacle connector, and the second common slot includes a second common receptacle connector,
the first controller includes:
a first processor;
a first switch;
a first selector and a second selector; and
a first port and a second port,
the second controller includes;
a second processor;
a second switch;
a third selector and a fourth selector; and a third port and a fourth port,
the first port is connected to the first common receptacle connector, the first selector, and the third selector,
the second port is connected to the first selector and the second selector via the first switch,
the first selector is connected to the first common receptacle connector,
the second selector is connected to the second common receptacle connector,
the third port is connected to the second common receptacle connector, the second selector, and the fourth selector,
the fourth port is connected to the third selector and the fourth selector via the second switch,
the third selector is connected to the first common receptacle connector, and
the fourth selector is connected to the second common receptacle connector.

2. The storage system according to claim 1, wherein the first device is an accelerator that performs compression processing, decompression processing, encryption processing, and/or decryption processing.

3. The storage system according to claim 1, comprising a plurality of controllers,
wherein the drive includes two drive ports,
the two drive ports are connected to different controllers in a case where the drive is inserted into the common slot, and
the first device is connected to any one of the plurality of controllers in a case where the first device is inserted into the common slot.

4. The storage system according to claim 1, wherein each wiring between the common slot and the port of the controller includes a plurality of lanes, and
the number of lanes of wiring connected in a case where the first device is inserted into the common slot is larger than the number of lanes of the wiring connected in a case where the drive is inserted into the common slot.

5. The storage system according to claim 1, wherein the common slot includes a drive-connecting receptacle connector and a first-device-connecting receptacle connector,
in a case where the drive is inserted into the common slot, a plug connector of the drive is connected to the drive-connecting receptacle connector, and
in a case where the first device is inserted into the common slot, a plug connector of the first device is connected to the first-device-connecting receptacle connector.

6. The storage system according to claim 1, wherein the common slot includes a common receptacle connector for drive connection and first device connection,
in a case where the drive is inserted into the common slot, a plug connector of the drive is connected to a first data transferring signal pin of the common receptacle connector, and
in a case where the first device is inserted into the common slot, a plug connector of the first device is connected to a second data transferring signal pin of the common receptacle connector different from the first data transferring signal pin.

7. The storage system according to claim 1, wherein a process executed in a case where a device is inserted into the first or second common slot includes:
detecting the device inserted into the first or second common slot;
identifying a device type of the detected device;

controlling connection destinations of the first, second, third, and fourth selectors on a basis of the identified device type; and linking up a connection destination port of the detected device.

8. The storage system according to claim 1, wherein the first controller includes a first microcontroller, the first microcontroller is connected to the first and second selectors and the first common receptacle connector, the second controller includes a second microcontroller, the second microcontroller is connected to the third and fourth selectors and the second common receptacle connector, and the first and second microcontrollers are configured to: be interconnected;

identify a device type of the detected device on a basis of information of the number of connection lanes of the detected device connected to the first or second common receptacle connector;

share information of the identified device type; and

control connection destinations of the first, second, third, and fourth selectors on a basis of information of the device type.

9. The storage system according to claim 8, wherein in a case where the drive is connected to the first common receptacle connector, the first microcontroller issues a wiring instruction to the first selector such that the first common receptacle connector and the first switch are connected to each other, the second microcontroller issues a wiring instruction to the third selector such that the first common receptacle connector and the second switch are connected to each other, and in a case where the first device is connected to the first common receptacle connector, the first microcontroller issues a wiring instruction to the first and second selectors such that the first common receptacle connector and the first processor are connected to each other.

* * * * *